United States Patent [19]

Aoki et al.

[11] Patent Number: 4,902,727
[45] Date of Patent: Feb. 20, 1990

[54] COMPOUNDS HAVING A POLYMERIZABLE ACYLURETHANE STRUCTURE, AND THEIR PRODUCTION AND PROCESS OF USING

[75] Inventors: Kei Aoki, Ikoma; Kazunori Kanda, Yao; Satoshi Urano; Ryuzo Mizuguchi, both of Yawata, all of Japan

[73] Assignee: Nippon Paint Co., Ltd., Osaka, Japan

[21] Appl. No.: 867,014

[22] Filed: May 27, 1986

[30] Foreign Application Priority Data

May 28, 1985 [JP] Japan ............................ 60-117310
May 28, 1985 [JP] Japan ............................ 60-117315
May 29, 1985 [JP] Japan ............................ 60-116192

[51] Int. Cl.$^4$ .......................... C08F 2/48; B05D 3/06
[52] U.S. Cl. .......................... 522/90; 427/44; 427/54.1; 427/389.8; 522/96; 522/97; 522/174; 526/301
[58] Field of Search .............. 522/90, 174, 96, 97; 427/54.1, 44, 389.8; 526/301

[56] References Cited

U.S. PATENT DOCUMENTS

| | | | |
|---|---|---|---|
| 2,736,722 | 2/1956 | Price | 526/301 |
| 3,850,770 | 11/1974 | Juna et al. | 525/920 X |
| 4,001,191 | 1/1977 | Reed Jr. | 526/301 X |
| 4,188,455 | 2/1980 | Howard | 525/920 X |
| 4,205,018 | 5/1980 | Nagasawa et al. | 522/97 X |
| 4,239,866 | 12/1980 | Reitel et al. | 525/920 X |
| 4,343,919 | 8/1982 | Tefertiller et al. | 522/96 X |
| 4,401,794 | 8/1983 | Driel et al. | 525/328.2 |
| 4,514,037 | 4/1985 | Bishop et al. | 522/97 X |

FOREIGN PATENT DOCUMENTS 1793501 11/1971 Fed. Rep. of Germany .
57-031970 2/1982 Japan ............................ 522/174
57-085808 5/1982 Japan ............................ 522/174
1193601 6/1970 United Kingdom .

OTHER PUBLICATIONS

Chemical Abstracts, 69(24): 97413x 1968.
Patent Abstracts of Japan, vol. 10, No. 107, Apr. 22, 1986.
Patent Abstracts of Japan, vol. 6, No. 177, Sep. 11, 1982.

*Primary Examiner*—Thurman K. Page
*Attorney, Agent, or Firm*—Wegner & Bretschneider

[57] ABSTRACT

A curable composition which comprises a polymerizable compound having an acylurethane group of the formula:

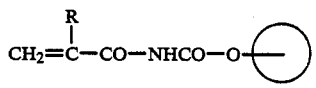

wherein R is a hydrogen atom or a lower alkyl group and

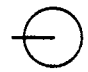

is the residue of a hydroxyl group-containing compound excluding a hydroxyl group therefrom, at least 1/10 of the total hydroxyl groups in the hydroxyl group-containing compound being substituted with said acylurethane group.

34 Claims, No Drawings

COMPOUNDS HAVING A POLYMERIZABLE ACYLURETHANE STRUCTURE, AND THEIR PRODUCTION AND PROCESS OF USING

The present invention relates to compounds having a polymerizable acylurethane structure. More particularly, it relates to compounds having one or more polymerizable acylurethane groups, and their production and use.

In general, compounds having an isocyanate group are widely used in the field of polymer chemistry because of their excellent reactivity. Particularly, those having a polymerizable double bond and an isocyanate group in the molecule are expected to have great usefulness, because the double bond and the isocyanate group can respectively participate in various reactions depending upon different reaction mechanisms. Specific examples are vinyl isocyanate (Angew. Chem., Int. Ed., 18, 319 (1979)), isocyanatoethyl methacrylate (Japanese Pat. Publn. (unexamined) No. 5921/79), acryloyl isocyanate (Chem. Ber., 84, 4 (1951)), methacryloyl isocyanate (Chem. Ber., 84, 4 (1951)), etc.

The present inventors have been engaged in the research work on acryloyl isocyanate and methacryloyl isocyanate and developed an industrial process for production of them from acrylamide or methacrylamide and oxalyl chloride (European Patent Application No. 0143613).

As a result of the extensive study for development of the industrial application of acryloyl isocyanate and methacryloyl isocyanate, it has been found that the reaction of those isocyanates with hydroxyl group-containing compounds can afford acylurethane group-containing compounds. The acylurethane group-containing compounds still maintain a polymerizable double bond in the acylurethane group, and this polymerizable double bond is very active so that said acylurethane group-containing compounds are readily polymerized under mild conditions. For instance, they can be polymerized with ease at a low temperature even in the absence of any catalyst.

As well known, the essential parts of optical fibers to be used for optical transmittance are often made of glass fibers, which are fragile and have inferior elasticity. Thus, the glass fibers are readily broken even by application of a small outer force. In order to prevent the glass fibers from breakage, a resinous material is coated on the outer surfaces of them. Typical examples of such resinous material are epoxy resins, urethane resins, etc. However, the elasticity and toughness provided by those resinous materials are still not satisfactory within a temperature range of −40 to 80° C., at which optical fibers are normally used. In addition, they require a relatively long time for curing, and therefore the processing efficiency is inferior. For overcoming this drawback, some proposals have been made (cf. Japanese Patent Publication (unexamined) Nos. 92553/82, 223638/83, etc.).

As stated above, the acylurethane group-containing compounds are curable at such a low temperature as −40 to 80° C. with a short period of time by irradiation with high energy rays or in the presence of catalysts. Yet, the cured products show excellent elasticity and toughness. Further, the cured products assure good adhesion when applied on appropriate substrates as coating materials. Thus, the acylurethane group-containing compounds are quite suitable as coating materials for optical fibers and other substrates.

Accordingly, a main object of the present invention is to provide an acylurethane group-containing compound having a polymerizable double bond, optionally with one or more other functional group. Said acylurethane group is representable by the formula:

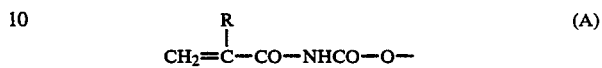  (A)

wherein R is a hydrogen atom or a lower alkyl group (e.g. methyl, ethyl). The term "polymerizable double bond" is intended to mean the ethylenic unsaturation in said acylurethane group (A), and it is radical polymerizable. As a typical example of the functional group which may be optionally present is an epoxy group. Thus, the acylurethane group-containing compound of the invention may be represented by the formula:

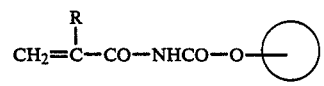

wherein

is the residue of a hydroxyl group-containing compound excluding a hydroxyl group therefrom and R is as defined above.

Another object is to provide a coating composition comprising as an essential component said acylurethane group-containing compound.

For production of the acylurethane group-containing compound, a hydroxyl group-containing compound may be reacted with an isocyanate compound of the formula:

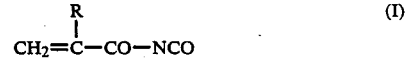  (I)

wherein R is as defined above. It is characteristic that this reaction can proceed with ease under mild conditions, e.g. at a relatively low temperature in the absence of any catalyst.

Alternatively, the acylurethane group-containing compound can be produced by reacting a hydroxyl group-containing compound with an isocyanate compound of the formula:

  (II)

wherein R is as defined above and subjecting the resultant product having a haloalkanoylurethane group of the formula:

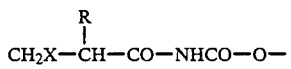

(B)

wherein R is as defined above and x is halogen to dehydrohalogenation. This process is disadvantageous in requiring two steps but is still industrially applicable.

As the hydroxyl group-containing compound, there may be used any one having at least one hydroxyl group. Particularly preferred are those having at least two hydroxyl groups in the molecule. While any particular limitation is not present on the molecular weight of the hydroxyl group-containing compound, those having a molecular weight of about 50 to 50,000, especially of about 60 to 20,000, are favorable in easy handling, because they are usually in a liquid having an appropriate viscosity. For instance, those having a molecular weight of not more than 50,000 can be used by themselves as coating materials without any solvent. In addition, the hydroxyl group-containing compound having a molecular weight within said range can give the acylurethane group-containing compound which affords a coating film having good physical properties.

Specific examples of the hydroxyl group-containing compound are as follows:

Polyether polyols such as polyalkylene glycols (e.g. polyethylene glycol, polypropylene glycol, polytetramethylene glycol, polyhexamethylene glycol) and adducts of alkylene oxides (e.g. ethylene oxide, propylene oxide, tetrahydrofuran) to polyols (e.g. ethylene glycol, diethylene glycol, propylene glycol, dipropylene glycol, glycerol, trimethylolpropane, 1,3-butanediol, 1,4-butanediol, 1,5-hexanediol, 1,2,6-hexanetriol, pentaerythritol, sorbitol, sorbitan, sucrose);

Polyester polyols such as condensation products of polybasic acids (e.g. phthalic acid, isophthalic acid, terephthalic acid, tetrahydrophthalic acid, tetrachlorophthalic acid, tetrabromophthalic acid, hexahydrophthalic acid, hymic acid, succinic acid, maleic acid, fumaric acid, adipic acid, sebacic acid, dodecenylsuccinic acid, trimellitic acid, pyromellitic acid) or their anhydrides with polyvalent alcohols (e.g. ethylene glycol, diethylene glycol, propylene glycol, dipropylene glycol, glycerol, trimethylolpropane, 1,3-butanediol, 1,4-butanediol, 1,6-hexanediol, neopentylglycol, 1,2,6-hexanetriol, pentaerythritol, sorbitol, bisphenol A), reaction products of said polyvalent alcohols with epoxy compounds (e.g. Kadula E, n-butylglycidyl ether, allylglycidyl ether) and said polybasic acids, alkyd type polyols obtained by reaction of polybasic acids (e.g. soybean oil, linseed oil, safflower oil, coconut oil, dehydrated castor oil, rosin) with said polyvalent alcohols and polymerization type polyester polyols obtained by ring opening polymerization of epsilon-caprolactam with said polyvalent alcohols;

Acryl polyols such as polymerization products of hydroxyl group-containing ethylenically unsaturated monomers (e.g. 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate) optionally with other monomers (e.g. methyl acrylate, methyl methacrylate, ethyl acrylate, ethyl methacrylate, n-butyl acrylate, n-butyl methacrylate, isobutyl acrylate, isobutyl methacrylate, ethylhexyl acrylate, ethylhexyl methacrylate, styrene, alpha-methylstyrene, vinyltoluene, t-butylstyrene, ethylene, propylene, vinyl acetate, vinyl propionate, acrylonitrile, methacrylonitrile, dimethylaminoethyl acrylate, dimethylaminoethyl methacrylate);

Polyurethane polyols such as addition products of isocyanate compounds (e.g. ethylene diisocyanate, propylene diisocyanate, tetramethylene diisocyanate, hexamethylene diisocyanate, 1-methyl-2,4-diisocyanatocyclohexane, 1-methyl-2,6-diisocyanatocyclohexane, omega,omega'-diisocyanatodiethylbenzene, omega,omega'-diisocyanatodimethylaminotoluene, omega,omega'-diisocyanatodimethylxylene, omega,omega'-diisocyanatodiethylxylene, lysine diisocyanate, 4,4'-methylenebis(cyclohexylisocyanate), 4,4'-ethylenebis(cyclohexylisocyanate), omega,omega'-diisocyanato-1,3-dimethylbenzene, omega,omega'-diisocyanato-1,4-dimethylbenzene, isophorone diisocyanate, 2,4-tolylene diisocyanate, 2,6-tolylene diisocyanate, 1,5-naphthylene diisocyanate, 4,4'-methylenebis(phenylisocyanate), triphenylmethane triisocyanate) or their polymers with low molecular weight polyols (e.g. ethylene glycol, propylene glycol, 1,3-butyl glycol, neopentyl glycol, 2,2,4-trimethyl-1,3-pentanediol, hexamethylene glycol, cyclohexanedimethanol, trimethylolpropane, hexanetriol, glycerol, sorbitol, sorbitan, sucrose, pentaerythriol) and addition products of said polyether polyols, polyester polyols, polymerization type polyester polyols or acryl polyols with isocyanate compounds chosen from monoisocyanates, diisocyanates, triisocyanates, etc.;

Epoxy compounds such as bisphenol A type epoxy resins, bisphenol F type epoxy resins, polycarboxylic acid ester type epoxy resins and aliphatic unsaturated compound type epoxy resins;

Polybutadiene compounds such as hydrogenated or non-hydrogenated 1,4-polybutadienediols having hydroxyl groups at the terminal positions;

Polychloroprene compounds such as chloroprene compounds having hydroxyl groups at the terminal positions and/or on the side chains;

Amino resin compounds such as alcohol-modified addition products of melamine, guanamine, urea, etc. with formaldehyde, particularly those having a high methylolation degree, more particularly butylated melamine resins having two or more methylol groups per a triazine ring;

Star-type polymer compounds such as polymers having active hydrogen atoms at the terminal positions obtained by cation polymerization of polyols (e.g. pentols) with alkylene oxides (e.g. ethylene oxide);

Phenol resins such as novolac type or resol type phenol resins obtainable by reacting phenol with formaldehyde, rosin-modified phenol resins, alkylphenol resins, butylated or allyl etherified resol resins;

Xylene resins;

Silicon compounds such as dimethyl(poly)siloxane, methylphenyl(poly)siloxane, methylvinyl(poly)siloxane, cyanoalkylmethyl(poly)siloxane and fluoroalkylmethyl(poly)siloxane, and their block copolymers and graft copolymers;

Vinyl polymers such as polyvinyl alcohol and polyvinyl acetal;

Cellulose compounds such as cellulose and nitro cellulose;

Oligosaccharides such as maltose and amylose, etc.

In addition to the above exemplified hydroxyl group-containing compounds, there are also usable low molecular weight hydroxyl compounds such as alkanols (e.g. methanol, ethanol, n-propanol, isopropanol, stearyl alcohol), alkenols (e.g. allyl alcohol, crotyl alcohol), aralkanols (e.g. benzyl alcohol, phenethyl alcohol), aralkenols (e.g. cinnamyl alcohol), phenol, di(lower)alkylamino(lower)alkanols (e.g., dimethylaminomethanol, dimethylaminoethanol, dimethylaminopropanol, diethylaminoethanol, diethylaminopropanol, N-methyl-N-ethylaminopropanol), di(lower)alkylaminophenols (e.g. o-dimethylaminophenol, m-dimethylaminophenol, p-dimethylaminophenol, m-diethylaminophenol), lower alkyl-phenylamino(lower)alkanols (e.g. N-methyl-N-phenylaminoethanol, N-methyl-N-phenylaminopropanol), lower alkylphenyl(lower)alkylamino(lower)alkanols (e.g. N-methyl-N-benzylaminoethanol, N-ethyl-N-benzylaminoethanol, N-ethyl-N-phenethylaminopropanol), N-hydroxypyrrolidine, N-hydroxypiperidine, N-hydroxymorpholine, pyrrolidino(lower)alkanols (e.g. pyrrolidinoethanol, pyrrolidinopropanol), piperidino(lower)alkanols (e.g. piperidinoethanol, piperidinopropanol), morpholino(lower)alkanols (e.g. morpholinoethanol, morpholinopropanol), di(lower)alkylamino(lower)alkoxy(lower)alkanols (e.g. dimethylaminoethoxyethanol, dimethylaminoethoxypropanol, diethylaminoethoxypropanol) and atropine. In general, however, these low molecular weight hydroxyl compounds are preferred to use not alone but in combination with those as previously exemplified.

As the isocyanate compound (I), there may be exemplified acryloyl isocyanate, methacryloyl isocyanate, ethacryloyl isocyanate, etc. Examples of the isocyanate compound (II) are beta-halopropionyl isocyanate, alpha-methyl-beta-halo-propionyl isocyanate, alpha-ethyl-betahalopropionyl isocyanate, etc.

The reaction between the hydroxyl group-containing compound and the isocyanate compound (I) may be effected in the presence or absence of any inert solvent at a temperature of −40 to 100° C., preferably from −20 to 50° C., more preferably from 0 to 30° C. Usually, the use of an inert solvent is favorable for smooth accomplishment of the reaction. In general, the hydroxyl group-containing compound may be used in an equimolar amount or more to the isocyanate compound (I).

Examples of the inert solvent are aliphatic hydrocarbons (e.g. pentane, hexane, heptane), aromatic hydrocarbons (e.g. benzene, toluene, xylene), alicyclic hydrocarbons (e.g. cyclohexane, methyl cyclohexane, decaline), petrolic hydrocarbons (e.g. petroleum ether, petroleum benzin), halogenated hydrocarbons (e.g. carbon tetrachloride, chloroform, 1,2-dichloroethane), ethers (e.g. ethyl ether, isopropyl ether, anisole, dioxane, tetrahydrofuran), ketones (e.g. acetone, methylethylketone, methylesobutylketone, cyclohexane, acetophenone, isophorone), esters (e.g. ethyl acetate, butyl acetate, propylene glycol monoethyl ether acetate, cellosolve acetate), acetonitrile, dimethylformamide, dimethylsulfoxide, etc.

The reaction between the hydroxyl group-containing compound and the isocyanate compound (II) may be also effected in the presence or absence of any inert solvent at a temperature of −40 to 100° C., preferably from −20 to 50° C., more preferably from 0 to 30° C. Usually, the use of an inert solvent is favorable for smooth accomplishment of the reaction. In general, the hydroxyl group-containing compound may be used in an equimolar amount or more to the isocyanate compound (II). Specific examples of the inert solvent are as exemplified above. The reaction in the subsequent step, i.e. the dehydrohalogenation of the haloalkanoylurethane group-containing compound, can be performed in the existence of any hydrogen halide-eliminating agent in the presence or absence of any inert solvent at a temperature of −40 to 100° C., preferably from −20 to 50° C., more preferably from 0 to 30° C. The inert solvent may be, if used, chosen from those as exemplified above.

As the hydrogen halide-eliminating agent, there may be used not only a hydrogen halide-eliminating agent in a strict sense, i.e. the one to be used theoretically in at least an equimolar amount to the haloalkanoylurethane group-containing compound, but also a hydrogen halide-eliminating catalyst, which may be employed in an amount smaller than the equimolar amount. Specific examples of the hydrogen halide-eliminating agent are amines such as triethylamine, 1,8-diazabicyclo[5.4.0]undecene-7, pyridine and quinoline, alkali metal or alkaline earth metal hydroxides such as sodium hydroxide, potassium hydroxide and magnesium hydroxide, metal oxides such as copper oxide, magnesium oxide, calcium oxide, alumina and iron oxide, metal complexes such as $(Ph_2Ru(CO)_3$ and $(PhP)_3Pt$ (wherein Ph is phenyl), metal halides such as lithium chloride, titanium chloride, aluminum chloride and sodium chloride, metal salts such as zinc naphthenate, nickel acetate, barium sulfate and potassium phosphate, metal alkoxides such as potassium t-butoxide, sodium ethoxide and sodium isopropoxide, synthetic zeolites such as molecular sieve and microporous glass, boric acid, oxirane, metal zinc, triphenyl phosphine, etc. Among them, particularly preferred are those chosen from amines, metal oxides, metal halides, synthetic zeolites, triphenyl phosphine, etc. The hydrogen halide-eliminating agent is normally employed in an amount of 0.1 to 100 mol, preferably of 0.1 to 10 mol, to 1 mol of the haloalkanoylurethane group-containing compound.

In the above reactions, it is necessary that at least a portion, preferably 1/10 or more of the hydroxyl groups present in the starting hydroxyl group-containing compounds are to be substituted to form an acylurethane group (A). Thus, substitution of all the hydroxyl groups is not necessarily required.

Recovery of the acylurethane group-containing compound from the reaction mixture may be effect by application of a per se conventional separation procedure such as concentration and filtration.

In any of the above reactions and the post-treatments, a small amount of a polymerization inhibitor may be incorporated into the reaction system or the reaction mixture for prevention of the unnecessary polymerization on the double bond. Examples of the polymerization inhibitor are hydroquinone, p-methoxyphenol, 2,6-di-t-butyl-4-methylphenol, 4-t-butylcatechol, bisdihydroxybenzylbenzene, 2,2′-methylenebis(6-t-butyl-3-methylphenol), 4,4′-thiobis(6-t-butyl-3-methylphenol), p-nitrosophenol, diisopropylxanthogensulfide, N-nitrosophenylhydroxylamine ammonium salt, 1,1-diphenyl-2-pycrylhydrazil, 1,3,5-triphenylpheldazil, 2,6-di-t-butyl-alpha-(3,5-d-t-butyl-4′-oxao-2,5-cyclohexadien- 1-ylidene)-p-trioxy, 2,2,6,6-tetramethyl-4-piperidone-1-oxyl, dithiobenzoylsulfide, p,p′-ditolyltrisulfide, p,p′-ditolyltetrasulfide, dibenzyltetrasulfide, tetraethylthiuramsulfide, etc.

The acylurethane group-containing compounds of the invention can be readily polymerized or cured by irradiation with high energy rays (e.g. alpha rays, beta rays, gamma rays, electron beam, X rays, near ultraviolet rays, ultraviolet rays), especially ultraviolet rays, or in the presence of catalysts such as peroxides. Therefore, the acylurethane group-containing compounds or their mixtures with other polymerizable monomers can be used as coating agents, adhesive agents, fillers, photoresists, etc.

The cured products of the acylurethane group-containing compounds of the invention with or without other polymerizable monomers are characteristic in high elasticity and toughness.

When the starting hydroxyl group-containing compound has an epoxy group in the molecule, the reaction with the isocyanate compound (I) or (II) proceeds usually between the hydroxyl group in the hydroxyl group-containing compound and the isocyanate group in the isocyanate compound (I) or (II) so that said epoxy group can be retained as such in the reaction product. Such acylurethane group-containing compound can be reacted with an amine so that the Michael type addition reaction proceeds with addition of the amine. When a polyamine is used as a curing agent, not only the epoxy group but also the ethylenic unsaturation can be reacted therewith so that the cured product shows a high elasticity due to a large crosslinking density. Further, said acylurethane group-containing compound is self-crosslinkable by irradiation with high energy rays or in the presence of radical catalysts and also can be subjected to copolymerization with an ethylenically unsaturated monomer so that a graft polymer comprising a carbon-carbon bond as the resinous chain is obtainable. Furthermore, said acylurethane group-containing compound can be reacted easily with a mercaptan compound whereby radical addition proceeds. Lewis acids such as hydrogen halides can be also added with ease. Moreover, the acylurethane group-containing compound can be reacted with an oxidizing agent such as hydrogen peroxide at the ethylenic unsaturation to make an additional epoxy group.

Utilizing those characteristic properties, the acylurethane group-containing compound having an epoxy group may be employed in various industrial fields. For instance, it may be cured by the use of a polyamine so that a coating film having a high toughness and a high adhesive strength is obtainable. When irradiated with ultraviolet rays or contacted with a free radical catalyst, self-crosslinking proceeds so as to attain curing. When grafted with an acryl resin, various characteristics can be imparted to the resulting product. In addition to the field of coating industry, the acylurethane group-containing compound may be used as an adhesive agent, a molding resin, a resin for electric instruments, etc.

A typical application field of the acylurethane group-containing compound of the invention is the field of coating industry. For such application, the acylurethane group-containing compound may be used alone, but it is practically formulated with other polymerizable monomers and additives such as polymerization initiators to give a coating composition comprising the acylurethane group-containing compound in an amount of not less than 0.5 % by weight.

Examples of the other polymerizable monomers are styrene, alpha-methylstyrene, vinyltoluene, acrylic esters (e.g. methyl acrylate, ethyl acrylate, butyl acrylate, dodecyl acrylate, 2-ethylhexyl acrylate, allyl acrylate, ethyl diethyleneglycol acrylate), methacrylic esters (e.g. methyl methacrylate, ethyl methacrylate, butyl methacrylate, dodecyl methacrylate, 2-ethylhexyl methacrylate, ethyl diethylene glycol methacrylate), allylic esters, crotonic esters, maleic esters, vinylpyrrolidone, diacetoneacrylamide, isobutozymethylacrylamides, acrylamide, N,N-dimethylacrylamide, acrylonitrile, methacrylonitrile, acrylic acid, itaconic acid, dimethylaminoethyl acrylate, vinyl ethyl ether, vinyl acetate, vinyl propionate, etc. These other polymerizable monomers may be preferred to use in an amount of not more than 50% by weight on the basis of the weight of the composition.

Examples of the polymerization initiators are benzoyl peroxide, t-butyl peroxybenzoate, acetophenone, benzophenone, etc. The amount of these polymerization initiators may be usually not more than 10 % by weight on the basis of the weight of the composition.

In addition, the composition may be incorporated with a resinous modifier (e.g. epoxy resins, polyamides, polyurethanes, polyethers, polyamide imides, silicon resins, phenol resins), a curing accelerator (e.g. cobalt naphthenate, zinc naphthenate, dimethylaniline), an organic silicon compound, a surfactant, etc.

For coating glass fibers with the coating composition of the invention, there may be adopted any per se conventional coating process (cf. German Offenlegungsschrift 2,459,320, Japanese Pat. Publication (unexamined) No. 139545/78, etc.). Then, ultraviolet rays are irradiated on the coating films provided on the surfaces of the optical fibers for curing.

The coating composition curable with high energy rays, particularly usable for coating optical fibers, comprises usually (1) a photocrosslinkable or non-crosslinkable polymer or oligomer, (2) a photopolymerizable monomer or low molecular weight oligomer, (3) a photopolymerization initiator or photosensitizer and (4) a heat polymerization inhibitor or stabilizer, optionally with a photosensitizing aid, a coloring agent or the like. Examples of the polymer or oligomer (1) are unsaturated polyester resins, urethane acrylate resins, epoxy acrylate resins, polyester acrylate resins, spirane acrylate resins, polyether acrylate resins, etc. Examples of the photopolymerizable monomer or low molecular weight oligomer (2) are styrene, vinyltoluene, divinylbenzene, vinyl acetate, acrylonitrile, methacrylonitrile, acrylic esters (e.g. methyl acrylate, ethyl acrylate, butyl acrylate, 2-ethylhexyl acrylate, glycidyl acrylate, ethylene glycol diacrylate, trimethylolpropane triacrylate), methacrylic esters (e.g. methyl methacrylate, ethyl methacrylate, butyl methacrylate, 2-ethylhexyl methacrylate, glycidyl methacrylate, ethylene glycol dimethacrylate, trimethylolpropane trimethacrylate), diethyl itaconate, dibutyl itaconate, diethyl fumarate, diethyl maleate, etc. in addition to the low molecular weight oligomer (1). As the photosensitizer (3), there are exemplified benzoin, benzoin methyl ether, benzoin propyl ether, benzoin butyl ether, benzophenone, diacetyl, benzyl, dibutylsulfide, dibenzylsulfide, etc. As the heat polymerization inhibitor (4), there are exemplified hydroquinone, t-butylhydroquinone, p-methoxyphenol, cathecol, benzoquinone, etc. The acylurethane group-containing compounds of the invention may be used all or a portion of the components (1) and/or (2).

Practical and presently preferred embodiments of the invention are illustratively shown in the following examples wherein part(s) and % are by weight.

REFERENCE EXAMPLE 1

Preparation of methacryloyl isocyanate

To a suspension of methacrylamide (17.9 g) and hydroquinone (0.18 g) in chloroform (100 ml) under cooling with ice in nitrogen stream, a solution of oxalyl chloride (20 ml) in chloroform (15 ml) was dropwise added. After completion of the dropwise addition, stirring was continued at room temperature for about 100 minutes. Hydroquinone (0.18 g) was added thereto, followed by stirring at 60° C. for 4 hours. The reaction mixture was allowed to cool and concentrated under reduced pressure. The residue was distilled under reduced pressure to give methacryloyl isocyanate as a colorless liquid having a boiling point of 52 to 53° C./39 mmHg.

REFERENCE EXAMPLE 2

Preparation of acryloyl isocyanate

To a solution of oxalyl chloride (95.25 g) in 1,2-dichloroethane (150 ml), a solution of acrylamide (35.5 g) and hydroquinone (0.54 g) in 1,2-dichloroethane (200 ml) was dropwise added in about 30 minutes at a temperature of $-30$ to $0°$ C. After completion of the dropwise addition, heating under reflux was continued for about 1 hour. The reaction mixture was allowed to cool and distilled under reduced pressure to give beta-chloropropionyl isocyanate (44.7 g) as a colorless liquid having a boiling point of 74 to 75° C./25 mmHg.

To a solution of beta-chloropropionyl isocyanate (13.35 g) in toluene (20 ml), molecular sieve 4A (20 g) was added, and heating under reflux was continued in nitrogen stream for 13.5 hours. The reaction mixture was allowed to cool, the molecular sieve was removed by filtration, and the filtrate was distilled under reduced pressure to give acryloyl isocyanate. B.P., 82 to 83° C./760 mmHg.

EXAMPLE 1

Preparation of a reactive acryl oligomer

Into a reaction vessel, xylene (165 parts) was charged, and the temperature was elevated to 120° C. while purging with nitrogen gas, during which a mixture of styrene (50 parts), methyl methacrylate (125 parts), 2-hydroxyethyl acrylate (150 parts), 2-ethylhexyl acrylate (150 parts), methyl acrylate (25 parts), laurylmercaptan (25 parts) and t-butyl peroxy-2-ethylhexanoate (10 parts) was dropwise added thereto in 3 hours to give an acryl oligomer having a molecular weight of 5,500 and a hydroxyl value of 144.

The reaction mixture containing the acryl oligomer was allowed to cool to 30° C., and methacryloyl isocyanate (28.5 parts) and hydroquinone (1.0 part) were dropwise added thereto in 30 minutes so that 2/10 of the total hydroxyl groups in said acryl oligomer was substituted. The reaction mixture was distilled under reduced pressure to remove volatile components, whereby a reactive acryl oligomer having a non-volatile component of 98 %, a molecular weight of 5,900 and a viscosity of 200 poise was obtained.

COMPARATIVE EXAMPLE 1

Into a reaction vessel, isophorone diisocyanate (57 parts), hydroquinone (0.25 part) and dibutyltin dilaurate (0.25 parts) were charged, and the temperature was elevated to 70° C. 2-Hydroxyethyl acrylate (30 parts) was dropwise added thereto in 30 minutes, followed by allowing to stand for 60 minutes to give a reaction mixture.

Into a separate reaction vessel, the acryl oligomer as prepared in Example 1 was charged, and hydroquinone (0.75 part) and dibutyltin dilaurate (0.5 part) were added. The temperature was elevated to 75° C., and said reaction mixture was dropwise added thereto in about 1 hour. The resultant mixture was distilled under reduced pressure to remove volatile components, whereby a resin having a non-volatile component of 98 %, a molecular weight of 6,100 and a viscosity of 210 poise was obtained.

EXAMPLE 2

Preparation of a reactive polyester acrylate oligomer

Into a reaction vessel, maleic anhydride (37 parts), sebacic acid (101 parts), long chain aliphatic dibasic acid ("SB-20" manufactured by Okamura Oil) (170 parts) and ethylene glycol (93 parts) were charged, and the reaction was carried out at a temperature of 180 to 200° C. until the acid value became 10. The reaction mixture was allowed to cool to room temperature, whereby a polyester oligomer having a molecular weight of 2,000 and a hydroxyl value of 52 was obtained.

After addition of hydroquinone (0.8 part), acryloyl isocyanate (18 parts) was dropwise added thereto at 30° C. in 30 minutes for substitution of 5/10 of the total hydroxyl groups in the polyester oligomer to give a reactive polyester acrylate oligomer having a molecular weight of 2,100.

EXAMPLE 3

Preparation of a reactive polybutadiene acrylate oligomer

Into a reaction vessel, a liquid polybutadiene resin having hydroxyl groups at both terminal positions ("Polybutadiene R45M" manufactured by Idemitsu PetroChemical; number average molecular weight, 2,800; hydroxyl value, 46.6) (500 parts) was charged, and the temperature was elevated to 60° C. Hydroquinone (1 part) and dibutyltin dilaurate (0.1 part) were added thereto. Methacryloyl isocyanate (37 parts) was dropwise added thereto in 30 minutes for substitution of 8/10 of the total hydroxyl groups in said "Polybutadiene R45M" to give a reactive polybutadiene acrylate oligomer.

EXAMPLE 4

Preparation of a reactive silicone acrylate oligomer

Into a reaction vessel, a silicone oil having primary alcoholic hydroxyl groups at both terminal positions of dimethylsiloxane ("X-22-160AS" manufactured by Shinetsu Chemical; number average molecular weight, 1,000; hydroxyl value, 112) (200 parts) was charged, and acryloyl isocyanate (39 parts) was dropwise added thereto at 30° C. in 30 minutes for substitution of the total hydroxyl groups in said silicone oil to give a reactive silicone acrylate oligomer having a molecular weight of 1,200.

EXAMPLE 5

Preparation of a reactive polyether acrylate oligomer

Into a reactive vessel, polypropylene glycol having a molecular weight of 2,000 (200 parts) and hydroquinone (0.4 part) were charged, and methacryloyl isocyanate (20 parts) was dropwise added thereto at 30° C. in 30 minutes for substitution of 9/10 of the total hydroxyl groups in said polypropylene glycol to give a reactive polyether acrylate oligomer having a molecular weight of 1,200.

COMPARATIVE EXAMPLE 2

Substitution of the hydroxyl groups in polypropylene glycol (200 parts) having a molecular weight of 2,000 as used in Example 5 with isophorone diisocyanate (44.4 parts) was attempted at 30° C., but the reaction did not proceed in the absence of any catalyst. Then, the reaction was carried out in the presence of dibutyltin dilaurate (0.2 part) at 70° C. 2-Hydroxyethyl acrylate (22.4 parts) and hydroquinone (0.4 part) were added to the reaction mixture to give a polyether acrylate. In comparison with Example 5, accomplishment of the acrylation required a higher temperature and two steps.

EXAMPLE 6

Preparation of a reactive alkylphenol acrylate oligomer

Into a reaction vessel, methylisobutylketone (200 parts) and an alkylphenol resin curable at room temperature ("Hitanol 1140" manufactured by Hitachi Chemical; molecular weight, about 1,500; phenolic hydroxyl value, 400) (200 parts) were charged, and the temperature was elevated to 60° C. to give a uniform resin solution. Hydroquinone (0.4 part) and dibutyltin dilaurate (0.4 part) were added thereto, and methacryloyl isocyanate (47.5 parts) was dropwise added thereto in 30 minutes. The reaction mixture was allowed to stand for 60 minutes to give a reactive alkylphenol acrylate oligomer being radical polymerizable.

COMPARATIVE EXAMPLE 3

To the resin solution as obtained in Example 6 (400 parts), hydroquinone (0.4 part) and dibutyltin dilaurate (0.4 part) were added at 60° C. The reaction product as obtained in Comparative Example 1 (145 parts) was dropwise added thereto in 30 minutes, and the resultant mixture was allowed to stand for 60 minutes. Disappearance of the peak of —NCO was not observed according to the IR absorption spectrum. The resultant mixture was again allowed to stand for additional 90 minutes. Disappearance of the peak of —NCO could not be observed. Thus, the reaction was interrupted.

EXAMPLE 7

Preparation of a reactive polyurethane acrylate oligomer

Into a reaction vessel, polyethylene glycol having a molecular weight of 200 (200 parts), dibutyltin dilaurate (0.1 part) and hydroquinone (0.2 part) were charged, and hexamethylene diisocyanate (112 parts) was dropwise added thereto at 50 to 60° C. in 2 hours, followed by stirring for 1 hour to give a polyurethane resin having a molecular weight of 950. For substitution of 9/10 of the total hydroxyl groups in said polyurethane resin, methacryloyl isocyanate (67 parts) was dropwise added thereto in 30 minutes to give a reactive polyurethane acrylate oligomer having a molecular weight of 1,200.

EXAMPLE 8

Preparation of a reactive epoxy acrylate oligomer

Into a reaction vessel, bisphenol A type epoxy resin ("YD-011" manufactured by Toto Chemical; epoxy equivalent, 450 to 500; hydroxyl number, 2/molecule; molecular weight, 900 to 1,000) (41.7 parts) and xylene (12.5 parts) were charged, and the contents were heated at 150° C. for 2 hours to remove water. Propylene glycol monomethyl ether acetate ("Dawanol PMA" manufactured by Dow Chemical) (29.2 parts) was added thereto, whereby the temperature was lowered to room temperature. Then, methacryloyl isocyanate (4.6 parts) was dropwise added thereto in 20 minutes under nitrogen stream so that the temperature was raised to about 50° C. After 30 minutes, the disappearance of the peak of —NCO was observed by IR absorption spectrum, and the reaction was finalized. The reaction product solution comprising a reactive epoxy acrylate oligomer had the characteristics as shown in Table 1.

EXAMPLE 9

In the same manner as in Example 8 but using bisphenol A type epoxy resin ("YD-014" manufactured by Toto Chemical; epoxy equivalent, 950; hydroxyl number, 3.7/molecule; molecular weight, 1,400) (28.6 parts), xylene (18.5 parts), cellosolve acetate (37.0 parts), methacryloyl isocyanate (8.3 parts) and 1,2-dichloroethane (7.6 parts), the reaction was carried out. The reaction product solution had the characteristics as shown in Table 1.

EXAMPLE 10

In the same manner as in Example 8 but using an epoxy resin constituted with bisphenol A, hydrogenated bisphenol A and epichlorohydrin (20 parts) ("ST-5100" manufactured by Toto Chemical; epoxy equivalent, 950), xylene (11 parts), propylene glycol monomethyl ether acetate (21 parts) and methacryloyl isocyanate (1.58 parts), the reaction was carried out. The reaction product solution had the characteristics as shown in Table 1.

EXAMPLE 11

Into a reaction vessel, bisphenol A type epoxy resin ("YD-014" manufactured by Toto Chemical) (147.8 parts) and xylene (72.1 parts) were charged, followed by heating for removal of water. After addition of azelaic acid (12.3 parts) and dimethylbenzylamine (0.3 part), the temperature was elevated to 140° C., and the reaction was continued for 4 hours until the acid value of the reaction mixture showed less than 0.7. The reaction mixture was then cooled to 100° C. and diluted with propylene glycol monomethyl ether acetate (168.2 parts). Then, methacryloyl isocyanate (8.9 parts) and 1,2-dichloroethane (22.9 parts) were added thereto, and the reaction was carried out as in Example 13. The reaction product solution had the characteristics as shown in Table 1.

EXAMPLE 12

In the same manner as in Example 11 but using bisphenol A type epoxy resin "YD-014" (147.8 parts), xylene (72.1 parts), azelaic acid (12.3 parts), dimethylbenzylamine (0.3 parts), propylene glycol monomethyl ether acetate (168.2 parts) and methacryloyl isocyanate (22.2 parts), the reaction was carried out. The reaction product solution had the characteristics as shown in Table 1.

EXAMPLE 13

In the same manner as in Example 11 but using bisphenol A type epoxy resin "YD-014" (147.8 parts), xylene (72.1 parts), azelaic acid (12.3 parts), dimethylbenzylamine (0.3 part), propylene glycol monomethyl ether acetate (168.2 parts) and methacryloyl isocyanate (57.7 parts), the reaction was carried out. The reaction product solution had the characteristics as shown in Table 1.

EXAMPLE 14

Into a reaction vessel, bisphenol A type epoxy resin "YD-014" (20 parts), xylene (15 parts) and cellosolve acetate (10 parts) were charged, and the contents were refluxed for 1 hour to dissolve the epoxy resin and to remove water. After cooling to room temperature, beta-chloropropionyl isocyanate (7 parts) was dropwise added thereto in 30 minutes, whereby the temperature of the reaction mixture was elevated to about 35° C. Then, butyl acetate (100 parts) was portionwise added thereto, and further triethylamine (6 parts) was added thereto, followed by stirring for 3 hours. The precipitate was removed by filtration to give a reaction product solution. The reaction product solution had the characteristics as shown in Table 1.

COMPARATIVE EXAMPLE 4

In the same manner as in Example 11 but using bisphenol A type epoxy resin "YD-014" (147.8 parts), xylene (72.1 parts), azelaic acid (12.3 parts), dimethylbenzylamine (0.3 parts) and propylene glycol monomethyl ether acetate (168.2 parts), the reaction was carried out. The reaction product solution had the characteristics as shown in Table 1.

Into a reaction vessel, polyethylene glycol having a molecular weight of 200 (200 parts), dibutyltin dilaurate (0.1 part) and hydroquinone (0.2 part) were charged, and hexamethylene diisocyanate (112 parts) was added dropwise thereto at a temperature of 50 to 60° C. in 2 hours, followed by stirring for 1 hour to give a polyurethane resin having a molecular weight of 950. Methacryloyl isocyanate (67 parts) was dropwise added thereto in 30 minutes for substitution of 9/10 of the total hydroxyl groups in said polyurethane resin, whereby a reactive polyurethane acrylate oligomer having a molecular weight of 1,200 was obtained.

EXAMPLE 18

Preparation of a reactive polyether oligomer

Into a reaction vessel, butyl acetate (342 parts), polytetramethylene glycol having a molecular weight of 2,000 (1,028 parts) and isophorone diisocyanate (222 parts) were charged, and the contents were well stirred. Dibutyltin dilaurate (1.25 parts) was added thereto, and the temperature was gradually elevated to 80° C. After 1 hour, nydroquinone (1.4 parts) was added thereto, and 2-hydroxyethyl acrylate (116 parts) was dropwise added thereto in 30 minutes, followed by keeping at 80° C. for 3 hours. The reaction mixture was distilled under reduced pressure to remove the solvent, whereby the reactive polyether oligomer was obtained.

TABLE 1

| Characteristics | Example 8 | 9 | 10 | 11 | 12 | 13 | Comparative Example 14 | 4 |
|---|---|---|---|---|---|---|---|---|
| Viscosity (Gardner viscometer, 25° C.) | F | P | $A-A_1$ | $Z_5$ | $Z_4 << Z_5$ | $Z_6 <<$ | UV | $Z_3$ |
| Concentration of reaction product in solution (%) | 52.1 | 40.5 | 42.8 | 42.3 | 46.2 | 49.5 | 52.1 | 43.0 |
| Number average molecular weight of reaction product | 2300 | 3200 | 2600 | 8600 | 8600 | 10300 | 3360 | 8300 |
| Conversion (HO→CH$_2$=C(CH$_3$)—CONHCOO—) (%) | 100.0 | 100.0 | 27.0 | 15.4 | 38.5 | 100.0 | — | — |
| Conversion (HO→CH$_2$=CH—CONHCOO—) (%) | — | — | — | — | — | — | 100 | — |

EXAMPLE 15

Preparation of a reactive polyether acrylate oligomer

Into a reaction vessel, polytetramethylene glycol having a molecular weight of 2,000 (200 parts) and hydroquinone (0.4 part) were charged, and methacryloyl isocyanate (22.2 parts) was dropwise added thereto at 30° C. in 30 minutes for substitution of the total hydroxyl groups in said polytetramethylene glycol, whereby a reactive polyether acrylate oligomer having a molecular weight of 2,200 was obtained.

EXAMPLE 16

Preparation of a reactive polyether oligomer

Into a reaction vessel, polyethylene glycol having a molecular weight of 300 (300 parts) and hydroquinone (0.4 part) were charged, and methacryloyl isocyanate (220 parts) was dropwise added thereto at 30° C. in 30 minutes for substitution of the total hydroxyl groups in said polyethylene glycol, whereby a reactive polyether oligomer having a molecular weight of 520 was obtained.

EXAMPLE 17

Preparation of a reactive polyurethane acrylate oligomer

EXAMPLE 19

To the reactive acryl oligomer as obtained in Example 1 (100 parts), diethoxyacetophenone (3 parts) was added to make a photo-curable coating composition. The composition was coated on a clean glass plate to make a coating film having a thickness of 100 microns, which was subjected to irradiation with ultraviolet rays as set forth below to obtain a cured coating film, which was non-sticky and had a pencil hardness of H.

For ultraviolet ray irradiation, a high pressure mercury lamp ("HI-20N" manufactured by Nippon Battery; 80 W/cm reflection plate; light collector used) was set in such manner that the lengthwise direction made a right angle with the advance direction of conveyor. The height from the conveyor surface was 80 mm, and the conveyor speed was 3 m/minute.

A cured film was prepared in the same manner as above but on a teflon plate and peeled off to obtain a test film. Using a tensilon tester, the test film was subjected to tensile test. The film had an initial Young's modulus of 17 kg/mm$^2$, an elongation of 65 % and a break strength of 3.05 kg/mm .

COMPARATIVE EXAMPLE 5

In the same manner as in Example 19 but using a resin as obtained in Comparative Example 1, a cured coating film was prepared. The cured film was subjected to tensile test in the same manner as in Example 19. The film had an initial Young's modulus of 9.5 kg/mm$^2$, an elongation of 60 % and a break strength of 1.7 kg/mm$^2$.

EXAMPLE 20

The reactive polyether acrylate oligomer as obtained in Example 5 was applied onto a clean glass plate to make a coating film having a thickness of 100 microns. After setting for 10 minutes, irradiation was made with an electron beam having an electron energy of 300 keV under an electron current of 30 mA to give a non-sticky cured coating film. The dose was 3 Mrad. In the tensile test at 40° C., the cured film showed a break strength of 11.59 kg/mm$^2$ and an elongation of 20 %.

COMPARATIVE EXAMPLE 6

Using the oligomer as obtained in Comparative Example 2, a cured coating film was prepared in the same manner as in Example 20. In the tensile test, the cured film showed a break strength of 1.12 kg/mm$^2$ and an elongation of 22 %.

EXAMPLE 21

The reactive polyester acrylate oligomer as obtained in Example 2 was applied onto an iron plate of 0.8 mm thick as chemically treated to make a coating film of 100 microns in thickness, followed by setting at room temperature for 15 minutes. Onto the coating film, X rays generated with a current of 40 mA under an accelerated voltage of 50 KV were irradiated for 100 seconds in a dose of 1,200,000 roentgens. The cured film was non-sticky and had a pencil hardness of H.

EXAMPLE 22

Into a solution of the reactive epoxy acrylate oligomer as obtained in Example 8 (100 parts), 55 % solution of methylethylketone peroxide in dimethyl phthalate ("Kayameck A" manufactured by Kayaku-Noully) (5 parts) and 6 cobalt naphthenate (2.5 parts) as the radical catalysts were incorporated to make a curable coating composition. The composition was applied onto a tin-plated steel plate to make a coating film of 20 microns in thickness and baked at 100° C. for 30 minutes to give a cured coating film, of which the pencil hardness was H. No peeling of the film was produced even after rubbing with xylene in 50 times.

EXAMPLE 23

Each of the reaction product solutions as obtained in Examples 12 and 13 and Comparative Example 4 was admixed with a polyamine curing agent ("SUNMIDE No. 305-70" manufactured by Sanwa Chemical; nonvolatile component, 70 %) in an amount as shown in Table 2 to make a curable coating composition. The composition was applied by a bar coater onto a tin plated steel plate of 0.8 mm thick to make a coating film having a thickness of 20 microns after drying, followed by baking at 100° C. for 30 minutes. The pencil hardness and the xylene rubbing test results of the cured coating film thus formed are shown in Table 2. In the rubbing test results, 0 indicates no hurt on the coating film even after rubbing of 50 times, and X indicates dissolving of the coating film by such rubbing.

TABLE 2

| Reaction product solution | Ex. 12 | Ex. 13 | Comparative Ex. 4 |
|---|---|---|---|
| Amount used (parts) | 10 | 10 | 10 |
| Amount of curing agent (parts) | 2 | 2 | 2 |
| Pencil hardness | H | F | H |
| Xylene rubbing test (50 times) | O | O | X |

EXAMPLE 24

Each of the reaction product solutions as obtained in Examples 12 and 13 and Comparative Example 4 was admixed with 55 % solution of methylethylketone peroxide in dimethyl phthalate and 6 % cobalt naphthenate solution as the radical curing catalysts in amounts as shown in Table 3 to make a photo-curable coatig composition. The composition was applied by a bar coater onto a tin plated steel plate in the same manner as in Example 23 to make a cured coating film. The pencil hardness and the xylene rubbing test of the cured film are shown in Table 3.

TABLE 3

| Reaction product solution | Ex. 12 | Ex. 13 | Comparative Ex. 4 |
|---|---|---|---|
| Amount used (parts) | 10 | 10 | 10 |
| Amount of Kayamec A (parts) | 0.5 | 0.5 | 0.5 |
| Amount of cobalt naphthenate (parts) | 0.25 | 0.25 | 0.25 |
| Pencil hardness | F | F | H |
| Xylene rubbing test (50 times) | O | O | X |

EXAMPLE 25

The reaction product solution as obtained in Example 9 (100 parts) was admixed with a photo-sensitizer ("U-1173" manufactured by Merck) (2 parts) to obtain a photo-curable coating composition. The composition was applied by a bar coater onto a clean tin plated steel plate of 0.8 m thick to make a coating film having a thickness of 20 microns after drying. The coating film was pre-dried at 70° C. for 5 minutes to evaporate the solvent and subjected to irradiation with a high pressure mercury lamp ("HI-40N" manufactured by Nippon Battery; 80 W/cm light collector type lamp) as in Example 19 but the conveyor speed was 4 m/minute. The cured coating film thus formed showed a pencil hardness of 2H and produced no abnormality at the surface in the acetone rubbing test (rubbing of 50 times).

EXAMPLE 26

To the reactive polyether acrylate oligomer as obtained in Example 15 (100 parts), benzoin methyl ether (1.5 parts) was added, followed by stirring to give a curable coating composition for optical fibers. The composition was applied by a doctor blade onto a clean glass plate to make a coating film of 200 microns in thickness after drying. The coating film was allowed to stand at room temperature for 2 hours and subjected to irradiation with a high pressure mercury lamp ("HI-20N" manufactured by Nippon Battery; 80 W/cm reflection plate; light collector used) as in Example 19 but the conveyor speed was 5 m/minute to give a cured coating film, which was transparent and non-sticky. The cured film was peeled off from the glass plate and subjected to tensile test. The initial Young's modulus was 0.22 kg/mm², and the elongation was 54 %.

EXAMPLE 27

The reactive polyether acrylate oligomer as obtained in Example 15 (20 parts), the reactive polyether oligomer as obtained in Example 18 (80 parts) and benzoin methyl ether (1.5 parts) were mixed together to make a coating composition for optical fibers.

In the same manner as in Example 26, a cured coating film was formed by the use of the above coating composition. In the tensile test, the cured film showed an initial Young's modulus of 0.40 kg/mm², an elongation of 63 % and a break strength of 0.25 kg/mm² at 20° C., and an initial Young's modulus of 0.37 kg/mm², an elongation of 55 % and a break strength of 0.20 kg/mm² at 60° C.

COMPARATIVE EXAMPLE 7

The reactive polyether oligomer as obtained in Example 18 (100 parts) and benzoin methyl ether (1.5 parts) were mixed together to make a coating composition for optical fibers.

In the same manner as in Example 26, a cured coating film was formed by the use of the above coating composition. In the tensile test, the cured film showed an initial Young's modulus of 0.61 kg/mm², an elongation of 45 % and a break strength of 0.19 kg/mm² at 20° C., and an initial Young's modulus of 0.58 kg/mm, an elongation of 35% and a break strength of 0.16 kg/mm² at 60° C.

EXAMPLE 28

The reactive silicone acrylate oligomer as obtained in Example 4 (100 parts) was admixed with diacetophenone (3 parts) to make a coating composition for optical fibers.

A material comprising quartz glass as the major component was spun to make a glass fiber having a diameter of 100 microns. Immediately after spinning, the above coating composition was applied onto the surface of the glass fiber through a die to make a coating film of 100 microns in thickness, followed by irradiation with ultraviolet rays. The thus obtained primary coating glass fiber did not produce any cracking or peeling on bending and had a sufficient strength.

EXAMPLE 29

The reactive polyester acrylate oligomer as obtained in Example 2 was roll coated onto the surface of a paper of 200 microns thick to make a coating film of 2 microns thick. After setting for 10 minutes, irradiation was made with an electron beam having an electron energy of 300 keV under an electron current of 30 mA to give a dose of 3 Mrad, whereby a cured coating film which was non-sticky at the surface was obtained. The cured film had a pencil hardness of H and showed a good adhesion in the cross-cut test with tape peeling off.

EXAMPLE 30

The reactive epoxy acrylate oligomer as obtained in Example 8 (100 parts) was admixed with 55 % solution of methylethylketone peroxide in dimethyl phthalate (5 parts) and 6 % cobalt naphthenate solution (2.5 parts) as the radical curing catalysts to make a curable coating composition.

The composition was applied onto the surface of a tin plated plate of 200 mm long and 25 mm wide to make a coating film of 100 microns thick. After setting for 20 minutes, another tin plated plate was placed thereon, a pressure of 5 kg/cm² was applied thereto, and baking was effected at 100° C. for 30 minutes to combine the tin plated plates. In the T peeling off test, a peeling strength of 5 kg/25 mm was shown.

EXAMPLE 31

Polyvinyl alcohol (saponification degree, 80.7 mol % average degree of polymerization, 500) (500 parts), polyvinyl alcohol (saponification degree, 87.7 mol %; average degree of polymerization, 500) (325 parts) and deionized water (680 parts) were charged in a kneader and mixed together at 90° C. for 30 minutes. The temperature was lowered to 60° C., and a mixture of hydroquinone (1.2 parts) and 2-hydroxyethyl methacrylate (1673 parts) was dropwise added thereto in 30 minutes. After completion of the dropwise addition, a solution of benzoin methyl ehter (50 parts) in dimethylsulfoxide (215 parts) was added thereto, and mixing was continued at 60° C. for 15 minutes to make a resin composition. To the resin composition (135 parts), the polyether oligomer as obtained in Example 16 (15 parts) was added, followed by mixing with the kneader and defoaming under reduced pressure to give a photo-curable coating composition.

The above coating composition was warmed at 60° C. and extruded through a slit onto a support on which a liquid mixture of polyvinyl alcohol and red iron oxide pigment was previously applied. A hard vinyl resin sheet was placed thereon, and a pressure of 20 kg/cm² was applied thereon for 5 minutes, followed by drying at 60° C. to give a photopolymer plate. A negative film was closely contacted onto the plate, and exposure to a mercury lamp was carried out for 3 minutes. Then, tap water was sprayed thereon for development to give a relief plate. The relief plate showed an excellent image reproducibility and had a good shoulder angle and a favorable mountain shape in section.

EXAMPLE 32

The acryl oligomer as obtained in Example 1 (100 parts) and an acrylic leveling agent (1.2 parts) were charged in a stainless steel made beaker and stirred well, followed by defoaming and evaporating to give an X raycurable composition.

The composition was applied by a doctor blade onto the surface of a polymethyl methacrylate plate of 5 mm thick to make a coating film of 200 microns thick. The plate was irradiated with X rays using tungsten as a counter-negative electrode under an accelerated voltage of 50 kV and a current of 40 mA to make a cured coating film. The dose of X rays was 1,200,000 roentgen. The cured film was transparent, and the pencil hardness was 2H.

EXAMPLE 33

The reactive polyurethane acrylate oligomer as obtained in Example 17 (100 parts) and benzoin methyl ether (2 parts) were mixed together to make a coating composition for leather.

The coating composition was applied onto the surface of a cow leather sheet to make a coating film of 10 microns thick, which was then irradiated with ultraviolet rays. The cured film had a sufficient elasticity.

What is claimed is:

1. A polymeric compound having a substituent of the formula:

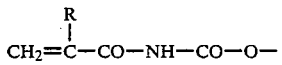

wherein R is $C_{1-5}$ alkyl, which can be derived from the corresponding compound having an OH group instead of said substituent and a molecular weight of at least 300.

2. A compound as claimed in claim 1, wherein said corresponding compound has a molecular weight of 300 to 50,000.

3. A compound as claimed in claim 2, which has a molecular weight of 300 to 20,000.

4. A compound as claimed in claim 1 wherein the corresponding compound has at least two OH groups.

5. A compound as claimed in claim 3, wherein at least 10% of the OH groups have been replaced by said substituents.

6. A compound as claimed in claim 1, which has at least one functional group in addition to said substituent.

7. A polymeric compound having an epoxy group and a substituent of the formula:

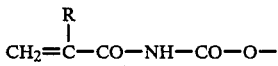

wherein R is H or $C_{1-5}$ alkyl, which can be derived from the corresponding compound having an OH group instead of said substituent and a molecular weight of at least 300.

8. A compound as claimed in claim 7, wherein said corresponding compound has a molecular weight of 300 to 50,000.

9. A compound as claimed in claim 8, which has a molecular weight of 300 to 20,000.

10. A compound as claimed in claim 7, wherein the corresponding compound has at least two OH groups.

11. A compound as claimed in claim 10, wherein at least 10% of the OH groups have been replaced by said substituents.

12. A polymeric compound having a substituent of the formula:

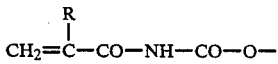

wherein R is H or $C_{1-5}$ alkyl, which can be derived from the corresponding compound having an OH group instead of said substituent and a molecular of at least 300, said corresponding compound being a member selected from the group consisting of polyester, polyols, acryl polyols, polyurethane polyols, epoxy compounds, polybutadiene compounds, polychloroprene compounds, amino resin compounds, star-type polymer compounds, phenol resins, xylene resins, silicon compounds, cellulose compounds and oligosaccharides.

13. A compound as claimed in claim 12, wherein said corresponding compound has a molecular weight of 300 to 50,000.

14. A compound as claimed in claim 13, which has a molecular weight of 300 to 20,000.

15. A process for preparing a polymeric compound having a substituent of the formula:

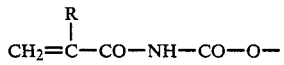

wherein R is H or $C_{1-5}$ alkyl, which comprises reacting the corresponding compound of a molecular weight of at least 300 having an OH group instead of said substituent with an isocyanate of the formula:

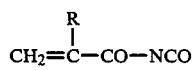

wherein R is as defined above, and the reaction is carried out in the absence of a catalyst at a temperature of $-20$ to 50? C.

16. A process as claimed in claim 15, wherein the corresponding compound has a molecular weight of 300 to 50,000.

17. A process as claimed in claim 15, wherein the compound has a molecular weight of 300 to 20,000.

18. A process as claimed in claim 15, wherein the corresponding compound has at least two OH groups.

19. A process as claimed in claim 15, wherein the reaction is effected in the presence or absence of an inert solvent.

20. A process as claimed in claim 15, wherein the reaction is effected at a temperature of 0 to 30° C.

21. A method for preparation of a polymer of high elasticity and toughness which comprises polymerizing a compound of a molecular weight of at least 300 having a substituent of the formula:

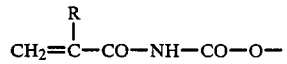

wherein R is H or $C_{1-5}$ alkyl, optionally with one or more other polymerizable compounds, and the polymerization is carried out in the presence of a catalyst at a temperature of $-20$ to 150° C.

22. A method as claimed in claim 21, wherein the polymerization is effected at room temperature to 120° C.

23. A method for preparation of a polymer of high elasticity and toughness which comprises polymerizing a compound having a constituent of the formula:

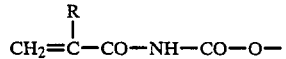

wherein R is H or $C_{1-5}$ alkyl, optionally with one or more other polymerizable compounds, wherein the polymerization is effected by irradiation with high energy rays.

24. A curable composition which comprises a polymeric compound of a molecular weight no less than 300 having a substituent of the formula:

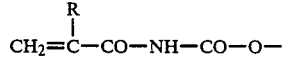

wherein R is H or $C_{1-5}$ alkyl.

25. A composition as claimed in claim 24, which comprises at least 0.5% by weight of the compound.

26. A composition as claimed in claim 24, which additionally comprises a polymerization initiator.

27. A composition as claimed in claim 24, which additionally comprises any other polymerizable compound.

28. A process for producing a cured product, which comprises applying a curable polymeric compound having a substituent of the formula:

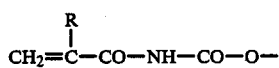

wherein R is H or $C_{1-5}$ alkyl and a molecular weight of at least 300 onto a substrate and curing the composition.

29. A process as claimed in claim 28, wherein the substrate comprises glass fibers.

30. A method as claimed in claim 21 for preparation of a polymer of high elasticity and toughness which comprises polymerizing a compound of a molecular weight of at least 300 having a substituent of the formula:

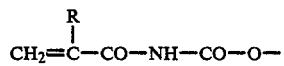

wherein R is H or $C_{1-5}$ alkyl, with one or more other polymerizable compounds.

31. A product made by the method according to claim 21.

32. The product made by the process according to claim 28.

33. The product made by the process according to claim 30.

34. A polymeric compound having a substituent of the formula:

$$CH_2=\overset{R}{\underset{|}{C}}-CO-NH-CO-O-$$

wherein R is H or $C_{1-5}$ alkyl, which can be derived from the corresponding compound having an OH group instead of said substituent and a molecular weight of at least 300, said corresponding compound being polytetramethylene glycol.

* * * * *